Nov. 21, 1950   T. L. JOHNSON   2,531,218
FLUID PRESSURE MOLDING
Filed May 31, 1946

INVENTOR
THEODORE L. JOHNSON
By Robert B. Terry
ATTORNEY

Patented Nov. 21, 1950

2,531,218

UNITED STATES PATENT OFFICE 2,531,218

FLUID PRESSURE MOLDING

Theodore L. Johnson, Kirkwood, Mo.

Application May 31, 1946, Serial No. 673,436

1 Claim. (Cl. 18—55)

This invention relates to improvements in fluid pressure molding, and more particularly to an improved method or process of molding articles of plastic materials by what may be termed a direct fluid contact technique, applicable particularly, but not exclusively, to the curing of low pressure laminate layups and preforms.

In molding plastic articles, particularly those of hollow form, the practice of molding has consisted predominantly in the use of bag molding or positive molding processes which, besides certain shortcomings and difficulties in attaining a requisite uniformity of cured article, entail considerable expense for first cost and replacement of molding bag equipment. In distinction, the subject process to be later fully described, obviates any necessity for a molding bag or comparable element to contain a curing fluid, this simplification of operations and minimization of costs constituting a primary object of the present developments.

Somewhat differently stated, the invention has as a general objective, the elimination of one of the usual paired mold elements between which the article under cure is kept confined under pressure through the period of cure.

A further object is noted as an improved molding technique, particularly applicable to certain plastics requiring only relatively low pressures incident to thermal curing thereof, the improvements objectively providing a method of application of heat and pressure through a fluid which is virtually in direct contact with at least one surface of a preshaped article subjected to curing conditions.

As exemplifying one, and a preferred step of practice, the invention objectively utilizes in lieu of a bag or similar element for molding, a so-called latex film, as hereinafter defined.

Still a further object is attained in improved provisions for removing entrained, entrapped and occluded air from a laidup or formed laminate prior to curing thereof, and incident to this objective may be importantly noted an improved mold-breathing practice.

Yet another valuable objective of the invention is attained in an improved step of surface wiping, whereby to condition the laidup laminate or other plastic, or a preform thereof, the step of wiping being accomplished with a squeegee effect, and if desired, interiorly of the mold and by utilization of a fluid under pressure to actuate the wiping agency.

The foregoing and numerous other objectives and advantages of the invention will more clearly appear from the following detailed description of a preferred method and series of steps thereof, as well as improved structure to this end, by reference to the accompanying drawing, in which.

Figure 1:
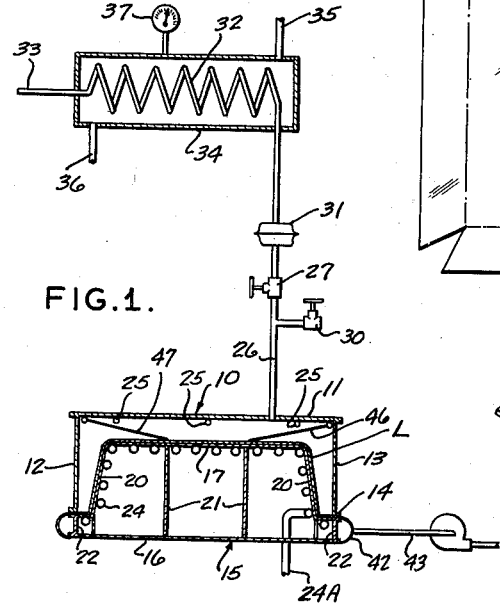
Fig. 1 is a sectional view on a relatively small scale through a mold or flask suitable for practice of the present method, and showing diagrammatically in connection therewith, certain accessories for breathing the mold and for supplying a heated fluid to the mold cavity for purposes of cure under controlled conditions of temperature and pressure.

Referring now by characters of reference to the drawing, Fig. 1 shows what may be considered as a vertical section through a two-part flask suitable for present purposes. In this figure and others of similar structure, the upper hollow flask element indicated generally at 10, includes a top 11 and side walls 12 and 13 together with end walls, usually of metal, the side walls being formed to provide sealing flanges 14 along their lower margins.

The complemental flask or mold portion is indicated generally at 15, and includes a bottom wall 16 and a hollow mold partition or supporting plate 17 which is of relatively rigid or unyielding character, and which prior to and during cure constitutes a rigid support for the laidup laminate or other plastic L. In the case of the plain flat rim sink selected for illustration and present disclosure because of the simplicity of its structure, the support 17 will consist of an uppermost planar portion with downwardly divergent sides and ends, one of the sides being indicated at 20. The rigidity of the planar portion 17 may be augmented by an intermediate support or plurality thereof, one being indicated at 21, and vertically bridging the elements 16 and 17. By preference the structure 17 is supported somewhat above the base closure 16 as by a shallow marginal closure channel 22, the upper flange 23 of which serves as a companion to the flange 14 above mentioned when the parts of the flask are brought into register and in the position of cure.

For the purpose of supplying heat for convective travel through the element 17 and as close as possible to the plastic body L being subjected to cure, there is provided a suitable length or number of lengths of pressure tubing 24 provided with a connection 24A to a source of steam or other heating fluid (not shown). It will be obvious that these may be replaced if desired, with enclosed electrical resistance elements for electrical heating elements (not shown). Similarly, the mold cavity existing primarily in the upper portion of the flask may be heated solely, primarily or as an auxiliary heat source by a suitable number of enclosed electrical resistance elements 25 shown somewhat diagrammatically in Fig. 1 and one of which appears in Figs. 4 and 5.

Provision is made for supplying a fluid such as heated air under a suitable temperature and pressure, to the mold cavity above and adjacent the article L to be cured, as through a supply pipe 26 provided with a shutoff valve 27 and a venting valve 30. Above the valve 27 in the line 26 is preferably disposed a pressure regulator unit as shown at 31. Above this the line 26 continues in and through a suitable heat exchanger exemplified by a coil 32, the inlet end 33 of which is supplied from a suitable source of compressed air such as a receiver (not shown). The companion element of the heat exchanger is shown as a drum or other form of enclosure 34 provided with an inlet 35 and an outlet 36 for steam or other heating fluid in thermal exchange with the air or the like moving through the coil 32. A gauge 37 indicates pressure say of the heating fluid, or may, if desired, be graduated directly in temperature to provide the requisite index of heating the air or the like supplied to the flask. The connection 35 may be connected to a suitable supply of steam, and the connection 36 disposed in a steam return line.

Figures 4, 5:
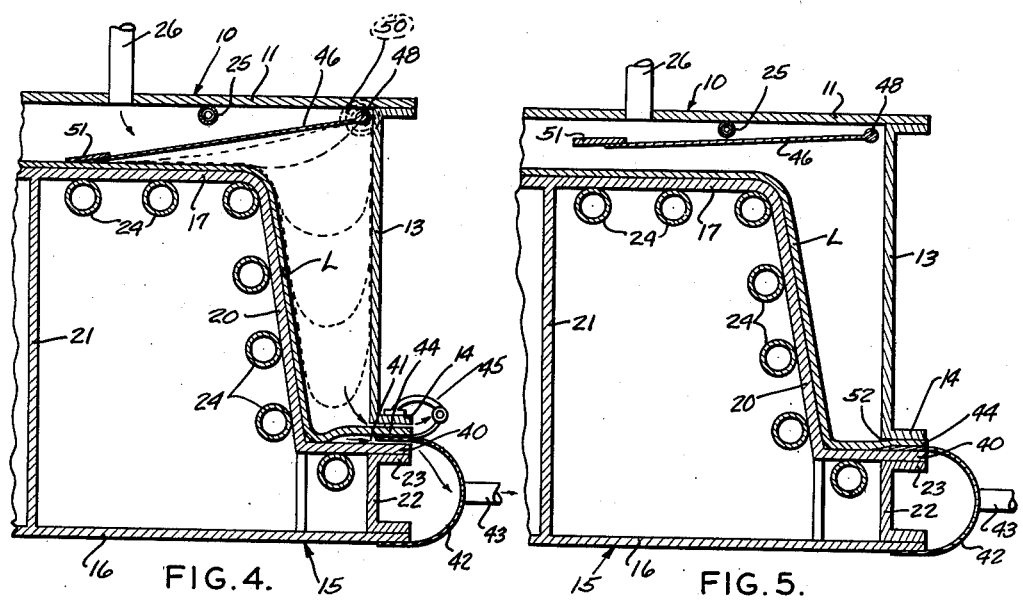
Fig. 4 is a fragmentary vertical sectional view through one side portion of a flask or mold, showing certain parts as they would appear during the step of breathing the mold.
Fig. 5 is a view similar to Fig. 4 but showing the parts of and within the mold as same would appear with the flask closed, as during the period of cure.

For purposes of and incident to breathing the mold prior to cure, certain improvements are included for permitting a slight parting of the component mold elements, as will best appear from Fig. 4. If the portion 10 be raised slightly from portion 15 to effect a minor separation of the flanges 14 and 23, or more accurately, a separation of flange 14 from the immediately subjacent flange 40 constituting an extension of element 17, an avenue is thus provided for escape of occluded or entrapped air which may exist between the laminate layup L and the floor or support 17. This air is cleared by withdrawing it through the passage 41 which is directed into a vacuum manifold 42 provided with a connection 43 to a vacuum chamber or pump (not shown). Incident to this operation, it will have been observed from Figs. 4 and 5, as a preference to extend the precured resinous material outwardly to form an extra lip or margin 44 disposed between the flanges 14 and 40. Embracing the flange 14 on one side and this protruding lip 44, is a spring clip consisting of two jaws, spring-urged together and pivotally connected. This clip or clamp is indicated generally at 45, and preferably extends the length of the mold along the side or end thereof, one being provided for each such parting zone.

The provision of the flanges 14, 40 and 23, and the spring clip 45 further enables, as will later appear, a separation of flange 14 and the projecting lip of plastic 44 for the purpose of breathing the cavity within the flask component 13, the lip 44 being depressed by fluid pressure applied as a preliminary step prior to cure, for this purpose. Assuming admission say of warm air through the line 26, and with a suitable fluid pressure in this line, the stream therefrom will proceed from an intermediate zone of the article outwardly along its margin, with a distinct wiping action, and will thence be driven outwardly to atmosphere through the opening between the lip 44 and flange 14. It will be noted that, for this purpose, the two jaws of the spring clamp 45 will become separated momentarily, or so long as the wiping air stream is caused to traverse the article in the mold.

It has been found that a greatly improved wiping action, particularly for the removal of occluded, entrapped or adhering particles of air or other vapors or fluids, may be had by the use of a movable wiper diaphragm, the number and arrangement of which will depend upon the shape of the article to be molded. Two such diaphragms are shown in Fig. 1 and indicated at 46 and 47. In the case of forming a somewhat rectangular object such as the flat rim sink illustrated, four such diaphragms would be employed, one at each end and one at each side of the mold cavity. These are preferably formed with acute angled mating margins (not shown), with a suitable corner lap, so as to minimize the flow of air around them.

Each such diaphragm or wiper as exemplified by member 46 is pivoted on a suitable pin 48 along or close to an upper margin of the adjacent wall such as 13 of the upper mold portion. A torsion spring 50 is so loaded and mounted on the pivot 48 as to tend to return the plate or diaphragm 46 to its uppermost position as shown by Fig. 4. The otherwise free end of the element 46 is provided with a soft, flexible, conforming end 51 in the nature of a wiper blade element, and as will appear, traverses the surface of the element L with a squeegee action. As fluid pressure is applied through the supply line 26 assuming utilization of the diaphragms, the latter being of extremely thin sheet metal of resilient nature, will be increasingly deflected as shown by the series of dotted lines of Fig. 4. They are permitted freely to be depressed with the aforesaid wiping action, by displacement of the air or other fluid below or beyond the diaphragms, outwardly through the channel now resulting by reason of displacement of the lip 44 to a position slightly below the flange 14 and against the bias of the arms of spring clip 45.

Figure 2:
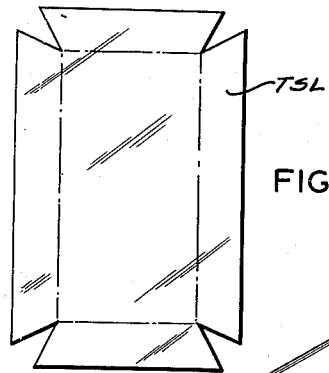
Fig. 2 is a plan view of a tailored sheet of a low pressure laminate material suitable for use in the formation of a plain flat rim sink.
Figure 3:
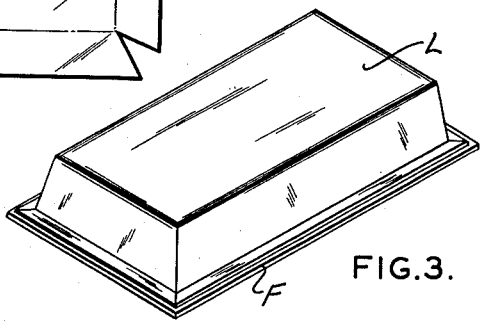
Fig. 3 is an isometric view of a layup or preform consisting say of a tailored and shaped body of low pressure laminate such as to be used to form, upon cure, a flat rim sink.

The steps involved in the present method are thought to have been fully apparent from the foregoing description of elements and their purpose, but it may be noted that, assuming a hollow article is to be formed, as exemplified by the plain flat rim sink, sheets TSL of a suitable low pressure laminate will be tailored, as in this case, approximately according to the pattern shown by Fig. 2 so as to minimize corner bulging, these being laid up over a suitable form element F or, if desired, directly over the correspondingly formed portion 17 of the lower flask component 15. The process contemplates the use of any suitable low pressure resins such as the "Series 5000" Selectron produced and sold by Columbia Chemical Company, and Pittsburgh Plate Glass Company, or "Interlake #4585" resins produced and sold by Interlake Chemicals, Inc. Others are suitable, the foregoing examples being mentioned only as such. Now it will be obvious that whether the laminate is laid up in sheet form externally of the mold, or upon one component thereof, there will result, following cure, a finished surface adjacent the relatively thin wall support 17 and so-called unfinished surface.

With the resin thus laid up, either in place or as a preform, a relatively tough impervious film is formed on the unfinished surface, being that surface exposed to the fluid in the mold cavity. Certain resins have the property of quickly forming a suitable film by a short preliminary exposure, say to heated air. In such cases the step of film formation may be accomplished in this manner. It is generally preferred, however, to provide such a film by application of a liquid preferably sprayed on to the now uppermost surface of the layup or preform. Such a film would be understood in the art as a latex film coat, whether or not formed of a dissolved latex crepe rubber or the like. Any of a number of suitable materials may be utilized to form the present latex film, a proven example consisting of Geon Latex PX8, (B. F. Goodrich Co.) a polyvinyl material in the form of a water dispersion of finely divided resin particles. This material has the property of quickly drying to form a requisitely tough film, upon a very short preliminary stage of treatment with a stream of heated air, applied to or through the mold as an oven, to effect a requisite solidification and cure of the film. Other polyvinyl latices are available which employ highly volatile solvents, which type will provide a somewhat quicker film formation. In any case, a short heat treatment is preferred for the purpose of fusing the resin particles of the latex film, to constitute thereof a reasonably strong fluid-tight coating. The specific materials mentioned for forming the latex film are solely by way of example and not intended as restrictive.

The flat rim sink selected for the present disclosure is preferably formed of an impregnated laminate laid up over a suitable form and after the same is laid up, the latex film applied, preferably by spray.

When the latex film is dried, as above described, it results in effect in a protective covering for the surface of the layup or preform to which it is applied and since, as will appear, the curing fluid is brought directly in contact with the film, the film constitutes in effect the mold element which is complemental to the portion 15 of the flask, more specifically the relatively thin heat-transferring supporting plate 17.

Assuming now the film to have been dried and fully formed, the entire laminate is rubbed down on the form to eliminate all voids and to bring the uncured laminate in close adjacence to the backing or supporting structure thereof. It is contemplated that the film be left on the cured and finished article.

Assuming now that the article, prior to cure but with the film formed thereon, has either been formed on the backing plate 17, or has been transferred thereto from a separate form, the mold may be breathed as above described, preferably by sequentially subjecting the assembly, as described, to the vacuum treatment through line 43, and the air treatment and wiping action by a preliminary flow of air through the line 26 under control of valve 27. Upon completion of these steps the spring clip 45 is removed or withdrawn, the component parts 10 and 15 of the flask are brought together in the relation shown by Fig. 5. Air, for example, or other suitable fluid is then admitted through line 33, 32 and 26 to the mold at a pressure predetermined by regulator 31 and at a temperature presumed to be under control by conventional means, the time of subjection of the unit L to curing being according to resin manufacturers' recommendation.

At the conclusion of cure, valve 27 will be closed and valve 30 opened to vent the mold cavity and restore it to atmospheric pressure. The flask components 10 and 15, it may be noted, are necessary to be subjected to outside pressure during the cure, only for the purpose of keeping them in assembly and not for the purpose of applying directly through the mold parts, any curing pressure.

Accordingly, upon release of the assembly means (not shown) directly acting on the flask components, the portion 10 may be lifted away or conversely the portion 15 removed from beneath the upper half of the mold, together with the now cured unit L. Usually because of the somewhat different temperature and pressure to which the projecting lip 44 is subject during the cure, the latter will be cut off from the body of the cured article say along a cutoff line indicated at 52, and the cured article with its film permanently adhering thereto removed from the support 17 for any finishing or adjunctive operations indicated by the nature and use of the article.

It should be noted importantly that, although the plain flat rim sink exemplifying an application of the method or process, is selected for its simplicity of structure, the method is equally applicable, with modifications now obvious, to the construction of boat hulls, refrigerator cabinets and parts, beverage cases, and hollow articles as well as flat articles of a great variety of types and forms, only a few such applications being mentioned.

It will now have appeared that the improved method and process as described may be practiced at a low cost, both for processing and from the point of view of fixed charges and necessary equipment, all in full attainment of the objectives specifically enumerated above, and others implied from the description.

Although the invention has been described by detailed reference to a preferred practice, such detail is to be understood in an instructive rather than in any limiting sense, inasmuch as numerous variants may be made without departing from the full intendment of the claim hereunto appended.

I claim as my invention:

The hereindescribed method of curing a plastic article containing at least a substantial proportion of a synthetic resin, which consists in substantially shaping the article prior to cure and disposing the thus-shaped unit in a two-part molding flask, subjecting one side of the article prior to cure, to a vacuum treatment for removal of occluded and adhering fluid, subjecting the opposite side of the unit to a flow of fluid whereby to cause a wiping action of the fluid upon the article, keeping the flask open during the vacuum and fluid treatments, forming a surficial film on at least a portion of the surface of the article to be cured, and in such location that the film is exposed in the mold cavity, sealing the flask, and applying to the mold cavity a fluid at a predetermined temperature and pressure to effect the cure of the article.

THEODORE L. JOHNSON.

REFERENCES CITED

The following references are of record in the file of this patent:

UNITED STATES PATENTS

| Number | Name | Date |
|---|---|---|
| 1,289,771 | Hopkinson | Dec. 31, 1918 |
| 1,737,874 | Busch | Dec. 3, 1929 |
| 2,331,296 | Bendix | Oct. 12, 1943 |
| 2,395,675 | Luth | Feb. 26, 1946 |